(12) United States Patent
   Liu

(10) Patent No.: US 9,787,789 B2
(45) Date of Patent: Oct. 10, 2017

(54) METHOD, DEVICE AND SYSTEM FOR PUSHING INFORMATION

(71) Applicant: Alibaba Group Holding Limited, George Town (KY)

(72) Inventor: Jili Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 441 days.

(21) Appl. No.: 14/155,077

(22) Filed: Jan. 14, 2014

(65) Prior Publication Data

US 2014/0201239 A1    Jul. 17, 2014

(30) Foreign Application Priority Data

Jan. 16, 2013    (CN) .......................... 2013 1 0016651

(51) Int. Cl.
   *G06F 17/30*    (2006.01)
   *H04L 29/08*    (2006.01)
   (Continued)

(52) U.S. Cl.
   CPC ........ *H04L 67/26* (2013.01); *G06F 17/30477* (2013.01); *H04L 51/02* (2013.01);
   (Continued)

(58) Field of Classification Search
   CPC ............. G06F 17/289; G06F 17/30867; G06F 17/30864
   (Continued)

(56) References Cited

U.S. PATENT DOCUMENTS 6,366,950 B1 *    4/2002    Scheussler .............. H04L 12/58
                                                 709/206
7,281,008 B1 *   10/2007    Lawrence ......... G06F 17/30864
                        (Continued)

FOREIGN PATENT DOCUMENTS

CN        101047662      10/2007
CN        101083545      12/2007
                (Continued)

OTHER PUBLICATIONS

The Chinese Office Action mailed Apr. 24, 2015, for Chinese Patent Application No. 201110009879.2, foreign priority application of U.S. Appl. No. 13/518,129, 6 pages.
(Continued)

*Primary Examiner* — Debbie Le
(74) *Attorney, Agent, or Firm* — Van Pelt, Yi & James LLP

(57)    ABSTRACT

Embodiments of the present application relate to a method for pushing information, a system for pushing information, and a computer program product for pushing information. A method for pushing information is provided. The method includes sending a query request including a user's instant messaging identifier to a target database, receiving a query result from the target database, the query result including data information corresponding to the user's instant messaging identifier, determining an instant messaging client to push the data information, the determination being based on the user's instant messaging identifier, and pushing the data information to the determined instant messaging client. The data information is looked up in the target database based on a stored correspondence between the user's instant messaging identifier and the data information.

23 Claims, 13 Drawing Sheets

(51) Int. Cl.
*H04L 12/58* (2006.01)
*H04L 12/18* (2006.01)

(52) U.S. Cl.
CPC ............ *H04L 51/04* (2013.01); *H04L 51/046* (2013.01); *H04L 12/1859* (2013.01)

(58) Field of Classification Search
USPC .......................... 707/999.003, E17.108, 770
See application file for complete search history.

(56) References Cited

U.S. PATENT DOCUMENTS

| | | | |
|---|---|---|---|
| 7,558,828 B1 | 7/2009 | Panzer | |
| 7,730,143 B1 | 6/2010 | Appelman | |
| 8,239,461 B2 * | 8/2012 | Jones | G06Q 30/02 |
| | | | 709/206 |
| 8,447,823 B2 * | 5/2013 | Zhang | G06Q 30/0269 |
| | | | 709/206 |
| 8,606,655 B2 * | 12/2013 | Allen | G06Q 30/02 |
| | | | 705/26.1 |
| 9,015,130 B1 | 4/2015 | Michaelis | |
| 2005/0108262 A1 | 5/2005 | Fawcett et al. | |
| 2005/0144279 A1 | 6/2005 | Wexelblat | |
| 2005/0171955 A1 | 8/2005 | Hull et al. | |
| 2006/0168054 A1 | 7/2006 | Burkhart et al. | |
| 2006/0168060 A1 | 7/2006 | Briand et al. | |
| 2007/0006027 A1 | 1/2007 | Desouza et al. | |
| 2007/0016641 A1 | 1/2007 | Broomhall | |
| 2007/0162432 A1 | 7/2007 | Armstrong et al. | |
| 2007/0203993 A1 | 8/2007 | Cai et al. | |
| 2007/0204063 A1 | 8/2007 | Banister et al. | |
| 2007/0254683 A1 | 11/2007 | Jie et al. | |
| 2007/0294351 A1 | 12/2007 | El-Emam | |
| 2008/0004048 A1 | 1/2008 | Cai et al. | |
| 2008/0005168 A1 | 1/2008 | Huff et al. | |
| 2008/0028031 A1 | 1/2008 | Bailey et al. | |
| 2008/0037755 A1 | 2/2008 | Glasgow | |
| 2008/0140674 A1 | 6/2008 | Ishikawa | |
| 2009/0006532 A1 | 1/2009 | Sinn et al. | |
| 2009/0063371 A1 | 3/2009 | Lin | |
| 2009/0100141 A1 | 4/2009 | Kirkland et al. | |
| 2009/0305678 A1 | 12/2009 | Machida | |
| 2010/0050095 A1 | 2/2010 | Yu | |
| 2010/0081464 A1 | 4/2010 | Qu et al. | |
| 2010/0250693 A1 * | 9/2010 | Zheng | G06Q 10/10 |
| | | | 709/206 |
| 2010/0274843 A1 | 10/2010 | Chen et al. | |
| 2012/0226561 A1 | 9/2012 | Sinn et al. | |
| 2012/0265831 A1 | 10/2012 | Sun | |
| 2013/0073588 A1 | 3/2013 | Cheng | |
| 2014/0201239 A1 * | 7/2014 | Liu | H04L 51/02 |
| | | | 707/770 |
| 2015/0271012 A1 | 9/2015 | Lv et al. | |

FOREIGN PATENT DOCUMENTS

| | | |
|---|---|---|
| CN | 101247406 | 8/2008 |
| CN | 101534261 | 9/2009 |
| CN | 102325172 | 1/2012 |
| CN | 102347848 | 2/2012 |
| CN | 102761496 | 10/2012 |
| JP | 2004241946 | 8/2004 |
| JP | 2008146355 | 6/2008 |
| JP | 2008171315 | 7/2008 |
| JP | 2009294986 | 12/2009 |
| WO | 2004061611 | 7/2004 |
| WO | 2009086765 | 7/2009 |

OTHER PUBLICATIONS

Chinese Office Action for Chinese Application No. 201110009879. 2, mailed on Oct. 27, 2015 (7 pages).
Japanese Office Action mailed Nov. 4, 2015 for Japanese Application No. 2013-549590, a counterpart foreign application of U.S. Appl. No. 13/518,129 (7 pages).
The Chinese Office Action mailed Feb. 7, 2014, for Chinese Patent Application No. 201110009879.2, foreign priority application of U.S. Appl. No. 13/518,129, 9 pages.
The Chinese Office Action mailed Oct. 17, 2014, for Chinese Patent Application No. 201110009879.2, foreign priority application of U.S. Appl. No. 13/518,129, 9 pages.
The PCT Search Report mailed Apr. 26, 2012 for PCT application No. PCT/US12/21326, 6 pages.
Extended European Search Report dated Jan. 13, 2017 for European patent application No. 127370724.4, 5 pages.
PCT Search Report and Written Opionion dated May 21, 2014 for PCT application No. PCT/US2014/011691, 10 pages.
English translation of Office Action issued in Japanese Application No. 2015-552679, dated Aug. 9, 2016, 19 pages.
Translated Chinese Office Action dated May 11, 2016, for Chinese Patent Application No. 201210147824.2, foreign priority application of U.S. Appl. No. 13/518,129, 7 pages.
Translated Chinese Office Action dated Nov. 4, 2015, for Chinese Patent Application No. 201210147824.2, foreign priority application of U.S. Appl. No. 13/518,129, 9 pages.
Translated Taiwanese Office Action dated Sep. 19, 2016, for Taiwan Patent Application No. 10521154280, foreign application related to U.S. Appl. No. 14/155,077, 11 pages.

* cited by examiner

600

800

900

METHOD, DEVICE AND SYSTEM FOR PUSHING INFORMATION

CROSS REFERENCE TO OTHER APPLICATIONS

This application claims priority to People's Republic of China Patent Application No. 201310016651.5 entitled A METHOD, EQUIPMENT AND SYSTEM FOR PUSHING INFORMATION, filed Jan. 16, 2013 which is incorporated herein by reference for all purposes.

FIELD OF THE INVENTION

The present application relates to a method, device, and system for pushing information.

BACKGROUND OF THE INVENTION

As Internet technologies further develop, various kinds of instant messaging systems have emerged. Instant messaging systems are used to communicate, and the instant messaging systems provide greater convenience for everyday living.

The instant messaging systems include instant messaging clients and instant messaging servers. Users acquire instant messaging clients from instant messaging servers and install the acquired instant messaging clients locally to communicate with other instant messaging users.

FIG. 1 is a diagram of an instant messaging client visual interface. Typically, the instant messaging client visual interface is divided into four zones.

A first zone is a dynamic message display zone that receives display messages sent by an instant messaging server. The display messages include a sender's ID and message content. As the quantity of information exchanged between the sender and a receiver increases, information displayed in the dynamic message display zone is "drowned" by newly generated information.

A second zone is an editing zone for messages to be sent. The editing zone allows the user to edit messages that are going to be sent and allows message publication requests to be sent to the instant messaging server. The message publication requests include the sender's ID, a receiver's ID, and the message content.

A third zone is a bulletin board zone. The instant messaging server pushes information to the bulletin board zone to be published. The pushed information is published for a relatively long time in the bulletin board zone, but information content is limited in size. Typically, the number of characters published in the bulletin board zone is limited to between 50 and 100.

A fourth zone is a group member information display zone or another information display zone. The fourth zone is relatively fixed.

Typically, two communication modes conducted by instant messaging system exist:

In a first communication mode, two users conduct message exchanges between themselves. In other words, a sending user sends a message via the second zone to the instant messaging server or directly to a receiving user that has established a link with the sending user. The receiving user receives the message from the instant messaging server or the sending user via the established link, and displays the message in the native first zone. This communication mode is limited to information exchanges between the two users. Also, the amount of data in messages sent by each user is relatively small. Even if the amount of data of the messages sent is larger, viewing a message sent by the other user in real-time is possible because the two users are online.

In a second communication mode, users in a group (e.g., a group of users who are interested in a particular game, live in a specific area, etc.) exchange communications between themselves. In other words, a plurality of users can communicate with each other through a group communication mode. In the group communication mode, a member of the group only sends one message to other members in the group and the other members will see the message content in the first zone. The group members can publish various kinds of messages in this mode. The group communication mode provides advantages in ease of operation and high publishing efficiency. The group communication mode is also well-suited for information broadcasts. For example, suppose that a user has an electronic shop on a website and the user establishes a group via an instant messaging system. In this example, the user is the group host user or administrator, and other users in the group are group members. The group host user can publish merchandise information via the established group. Two specific modes of publication exist. A first publication mode includes publishing merchandise information via an instant messaging server to the second zone of the clients of the group members. A second publication mode includes publishing the merchandise information via an instant messaging server to the third zone of clients of the group members.

In the first publication mode, the group host user sends his own group ID and a portion of the merchandise information from his electronic shop to the second zone of the clients of the group members via the instant messaging server. The instant messaging server determines group members based on the group host user's group ID and pushes the merchandise information to the clients of the group members for display in the first zone so that the group members can view the merchandise information. Not only is the group host user's merchandise information published to provide advertising for the group host user's merchandise, but the first publication mode also facilitates viewing the merchandise information by the group members.

However, the first publication mode whereby merchandise information is published to the first zone of instant messaging clients for display suffers from at least the following limitations:

First, information displayed in the first zone is in a "fluid" state. In other words, a message that is first published can be "drowned" by messages that are published later.

Through the instant messaging server, the group host user sends the merchandise information to be published to the clients where the group members are currently located. As the merchandise information is exchanged between group members, the merchandise information published by the group host user will be "drowned" in a large amount of exchanged information. As a result, group members who login to the instant messaging server after a large amount of exchanged information is received are unable to see the merchandise information published by the group host user immediately. This drowning of the merchandise information lowers the promotional effectiveness of the merchandise information. Also, because of the increase in information exchanged between the group members to the group host user, the exchanged information greatly increases the amount of information sent by the instant messaging server while adding to the load on the instant messaging server and the user clients.

Second, in the first publication mode, publishing merchandise information is more complex.

When the group host user is to publish merchandise information through the instant messaging server, the first step is to edit the merchandise information in the second zone of the instant messaging client where the group host user is logged into. Due to the limited space of the editing zone, the merchandise information is edited to be relatively concise. Since the edited merchandise information is relatively concise, the edited merchandise information cannot highlight the key points of the original merchandise information. The second step is to send the edited merchandise information and the group host user ID to the instant messaging server. The instant messaging server determines group member IDs based on the group host user ID and sends the merchandise information to the clients where group members are located to be displayed in the first zone based on the determined group member IDs.

In the second publication mode, the group host user sends merchandise information to-be-published and the group host user ID to the instant messaging server. The instant messaging server pushes the received merchandise information to clients where group members corresponding to the group host user ID are located for display in the bulletin board zone.

When the second publication mode is employed, content of the published merchandise information is overly simple because of the limited space in the bulletin board zone. Because the content is overly simple, the content only reminds the group members that promotion activities exist. The group host user takes the merchandise information to be promoted, edits the merchandise information, and sends the merchandise information to the instant messaging server in accordance with the bulletin board zone display requirements in the instant messaging software. When the merchandise information undergoes a change, the changed merchandise information is to be re-edited. As a result of the second publication mode, the group host user publishes the merchandise information inefficiently, and the merchandise information is published via the second publication mode with relatively great effort and poor results.

To summarize, the conventional publication modes are restricted in the ways of promoting merchandise information with instant messaging clients, published inefficiently, and fail to meet the user's information publishing goals.

BRIEF DESCRIPTION OF THE DRAWINGS

Various embodiments of the invention are disclosed in the following detailed description and the accompanying drawings.

DETAILED DESCRIPTION

Figure 1:
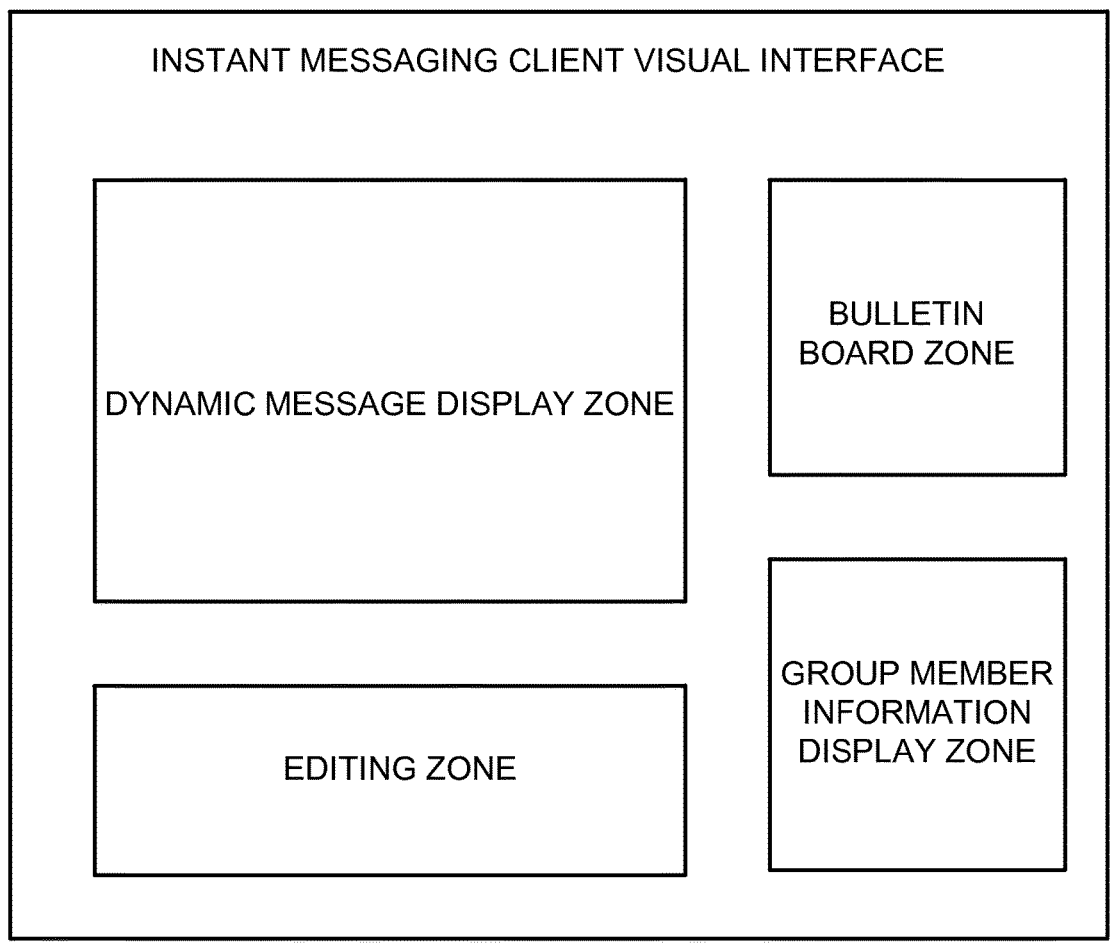
FIG. 1 is a diagram of an instant messaging client visual interface.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to increase efficiency of publishing information, a method, device and system for pushing information are provided. Correspondences between user instant messaging identifiers and data information are established. When an instant messaging server receives a user's login request, the user's login request includes a user's instant messaging identifier to be included in a query request message. After the user logs in, the instant messaging server sends the query request message to a target database. The target database determines data information corresponding to the user's instant messaging identifier based on a stored correspondence between the instant messaging identifier and the data information, and the target database includes the data information and the user's instant messaging identifier in a return result. The target database sends the return result to the instant messaging server. The instant messaging server determines the instant messaging clients for pushing information based on the user's instant messaging identifier included in the return result. Subsequently, the instant messaging server pushes the data information to the determined instant messaging clients for display.

The merchandise information that the user is going to publish serves as data information stored at the instant messaging server. When a user logs into the instant messaging server, the instant messaging server looks up, in the target database, data information corresponding with the user's instant messaging identifier, and pushes the found data information to the instant messaging client related to the user. Subsequently, the user's instant messaging client displays the data information. The editing steps that the user performs on merchandise information to be published are simplified. Moreover, the efficiency of merchandise information published by the user is increased, and users using instant messaging software to promote their own merchandise information have increased satisfaction.

In some embodiments, the target database is a database that stores correspondences between users' instant messaging identifiers and the data information to be published. The users' instant messaging identifiers can be used to look up the data information to be published. In some embodiments, the data information refers to merchandise information to be published or address information for data information to-be-published. In some embodiments, the data information corresponds to advertising information, etc. for a user's electronic shop. Table 1 is an example of a diagram of a format used to store the data information in the target database:

TABLE 1

| User's instant messaging identifier | Data information (Data information content and time information) |
|---|---|
| 11111111 | www.XYZ.com, Discount information, 05.01-05.03 |
| 22222222 | www.YYYY.com, Flash sale information, 09:00-19:00 |
| 33333333 | www.ZZZZ.com |
| 44444444 | Merchandise information and picture information |

As shown in Table 1, each user's instant messaging identifier corresponds to data information. In the event that the data information corresponding to a user's instant messaging identifier is address information, the data information looked up using the user's instant messaging identifier is site information corresponding to the address information. For example, a user's instant messaging identifier "33333333" corresponding to "www.ZZZZ.com" means that the data information looked up using "33333333" is the content of data information at the site having the host address "www.ZZZZ.com." When the content of the data information corresponding to a user's instant messaging identifier is address information and setting information, the content of the data information looked up using the user's instant messaging identifier is data content corresponding to the setting information in site information corresponding to the address information. For example, 11111111 corresponds to "www.XYZ.com, Discount information" means that content of the data information looked up using "111111111" as the user's instant messaging identifier is the data content of the "Discount information" in the site information corresponding to the host address "www.XYZ.com."

For example, Table 1 is edited and sent to a target database corresponding to a user's instant message identifier. Table 1 can also include promotion information corresponding to the user's instant message identifier and be automatically obtained by the server and stored in the target database. For example, user 1111111 edits the promotion information. The promotion information includes a corresponding URL xyz.com, Discount information, 0.5.01-0.5.03, and then the server sends the promotion information to a target database. Table 1 can also include promotion information that is edited by user 111111, and the server obtains the corresponding promotion information and sends the promotion information to the target database.

As an example, a data information item in the target database also includes time information. In some embodiments, the time information is in units of seasons, months, weeks, days, hours, minutes, and the like. In one example, the time interval "05.01-05.03," which is in units of days, is from May 1 to May 3. In another example, the time interval "09:00-19:00," which is in units of hours, is from 9 AM to 7 PM. The time interval is used to express the effective period of time for content of corresponding data information looked up using the user's instant messaging identifier. In other words, the user's content of data information looked up using the user's instant messaging identifier is valid within the time interval and invalid at other times. Please note that it is understood that an absence of time information indicates that the data information is not subject to time interval restrictions and is valid at any time.

As an example, when the user is a group host user, the target database stores a correspondence between the group host user's instant messaging identifier and the data information. When the user is also a group member, the target database stores a correspondence between the data information and the instant messaging identifier of the group host user corresponding to the group member. In some embodiments, the target database also stores a correspondence between the instant messaging identifier of the group member and the instant messaging identifier of the group host user and a correspondence between the instant messaging identifier of the group host user and the data information.

Figure 2:
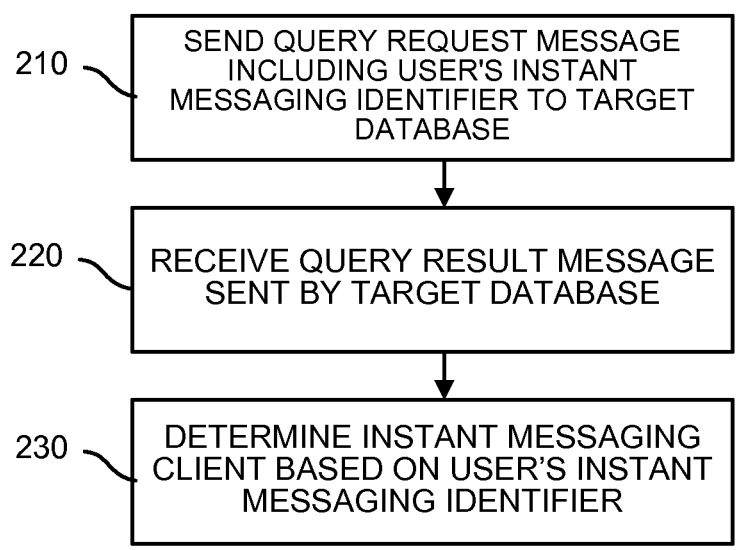
FIG. 2 is a flowchart illustrating a first embodiment of a method for pushing information.

FIG. 2 is a flowchart illustrating a first embodiment of a method for pushing information. In some embodiments, the method 200 is implemented by an instant messaging server 910 of FIG. 9 and includes:

In 210, the instant messaging server sends to a target database a query request message including a user's instant messaging identifier. The present application is based on group messaging, so if the group host user satisfies a predefined set of requirements (e.g., the group host user is a seller for an electronics shop), when the group host user logs on to the instant messaging server, the group host user can cause a query request message to be sent. In some embodiments, the group host user initiates a query request. In some embodiments, a group member logging onto the instant messaging server initiates the query request.

When a relatively large number of users are using instant messaging system, it is assumed that there will be relatively many users publishing messages via the instant messaging system. Therefore, correspondences between users' instant messaging identifiers and the data information to be published are stored in the target database.

In various embodiments, the target database includes a distributed database, a centralized database, or other type of database.

No limit on the number of target databases exists. Therefore, when a relatively larger amount of data exists, more target databases are to be used than for a smaller amount of data. In some embodiments, the instant messaging server locally stores correspondences between users' instant messaging identifiers and target database identifiers. In some embodiments, the correspondences are used to determine target databases where data information corresponding to the users' instant messaging identifiers are placed. The correspondences increase the speed of receiving results for data information queries.

As an example, the instant messaging server determines the target database corresponding to the user's data information to-be-published based on the locally stored correspondence between the user's instant messaging identifier and target database identifier.

Then, the instant messaging server sends a query request message including the user's instant messaging identifier to the determined target database.

For example, the users' instant messaging identifiers are "1111111," "AAAAAAAA," and "22222222" and their respective data information is stored respectively in three target databases with target databases identifiers of: Target 1, Target 2 and Target 3. Thus, the instant messaging server locally stores the correspondence between "1111111" and a corresponding entry in Target 1, the correspondence between "AAAAAAAA" and a corresponding entry in Target 2, and the correspondence between "22222222" and a corresponding entry in Target 3.

When the instant messaging server receives a login request message including the instant messaging identifier "11111111" sent by the user, the instant messaging server first authenticates the user's login. Then, after successfully authenticating the user, the instant messaging server determines that the target database where the user's data information to-be-published is stored is the Target 1 database based on the locally stored correspondence between the instant messaging identifier "1111111" and Target 1. The instant messaging server sends the query request message including the instant messaging identifier "11111111" to the determined target database corresponding to Target 1.

In another example, when the instant messaging server sends a query request message to the determined target database, the query request message includes the user's instant messaging identifier, and the user's instant messaging identifier is sent to the target database. In yet another example, after the target database receives a query request message, the target database could request the instant messaging server to report the user's instant messaging identifier. Upon receiving the request, the instant messaging server reports the received user's instant messaging identifier to the target database.

In 220, the instant messaging server receives a query result message sent by the target database. The query result message includes data information corresponding to the user's instant messaging identifier.

In some embodiments, the target database looks up the data information based on a stored correspondence between the user's instant messaging identifier and the data information.

After the target database receives the query request message from the instant messaging server, the target database looks up the data information corresponding to the user's instant messaging identifier included in the query request message based on the locally stored correspondence between the instant messaging identifier and the data information.

For example, if the user's instant messaging identifier included in the query request message is "11111111," the target database looks up the data information corresponding to "11111111," i.e., www.XYZ.com, Discount information, 05.01-05.03 based on the locally stored correspondence between the user's instant messaging identifier and the data information.

After the target database looks up the data information corresponding to the user's instant messaging identifier, the target database sends back a query result message to the instant messaging server. The query result message includes the data information (e.g, www.XYZ.com, Discount information, etc.) corresponding to the user's instant messaging identifier.

Referring back to 210, in some embodiments, the instant messaging server sends a plurality of query request messages to the target database. Each received query request message includes a different user's instant messaging identifier corresponding to different data information. Moreover, the target database regards the data information corresponding to each user's instant messaging identifier as a query result for that user's instant messaging identifier. The target database sends the data information corresponding to each user's instant messaging identifier and that user's instant messaging identifier in a query result message to the instant messaging server. Thus, upon receiving the query result message, the instant messaging server can locate the data information to-be-published for each user.

In 230, the instant messaging server determines an instant messaging client to push the data information based on the included user's instant messaging identifier, and pushes the data information to the determined instant messaging client.

When the instant messaging server receives the query result message sent by the target database, the instant messaging server determines the instant messaging client corresponding to the user based on the user's instant messaging identifier included in the query result message, and pushes the data information included in the query result message to the determined instant messaging client.

As an example, when the included data information includes only address information (for example, URL link address information), the instant messaging server determines a corresponding site server based on the address information and acquires data content (e.g., product information in a web site (URL link address)) from the site server corresponding to that address information. The instant messaging server pushes the acquired data content to the determined user's instant messaging client.

In the event that the included data information includes text and picture information of the electronic shop, the instant messaging server directly pushes the received text and picture information of the electronic shop to the determined instant messaging client.

In the event that the included data information includes address information (for example, URL link address information) and setting information, the instant messaging server determines a corresponding site server based on the address information and acquires, from the site server, data content relating to the setting information (e.g., product promotion information) in the site server corresponding to the address information. The instant messaging server pushes the acquired data content to the determined instant messaging client.

In another example, in the event that the included data information includes time information, the instant messaging server, before pushing the data information included in the query result message to the determined instant messaging client for display, compares the time information in the received data information to local operating time information. In the event that the local operating time information is within requirements of the time information in the data information, the data information included in the query result message is pushed to the determined instant messaging client for display. In the event that the local operating time information is not within the requirements of the time information (e.g., the time interval "05.01-05.03," which is in units of days, relates to May 1 to May 3. In another example, the time interval "09:00-19:00," which is in units of hours, relates to 9 AM to 7 PM) in the data information, the data information is not pushed to the determined instant messaging client.

In the first embodiment, merchandise information that a user is to publish is saved as data information at the instant messaging server. In the event that the user logs into the instant messaging server, the instant messaging server looks up the data information in the target database corresponding to the user's instant messaging identifier, and the instant messaging server pushes the data information to the instant messaging client used by that user and displays the data information on the instant messaging client. This method simplifies the editing operation that the user performs on the merchandise information to be published. Moreover, the method increases the efficiency of merchandise information publishing by the user, and helps users to promote their merchandise information via the instant messaging system.

Figure 3A:
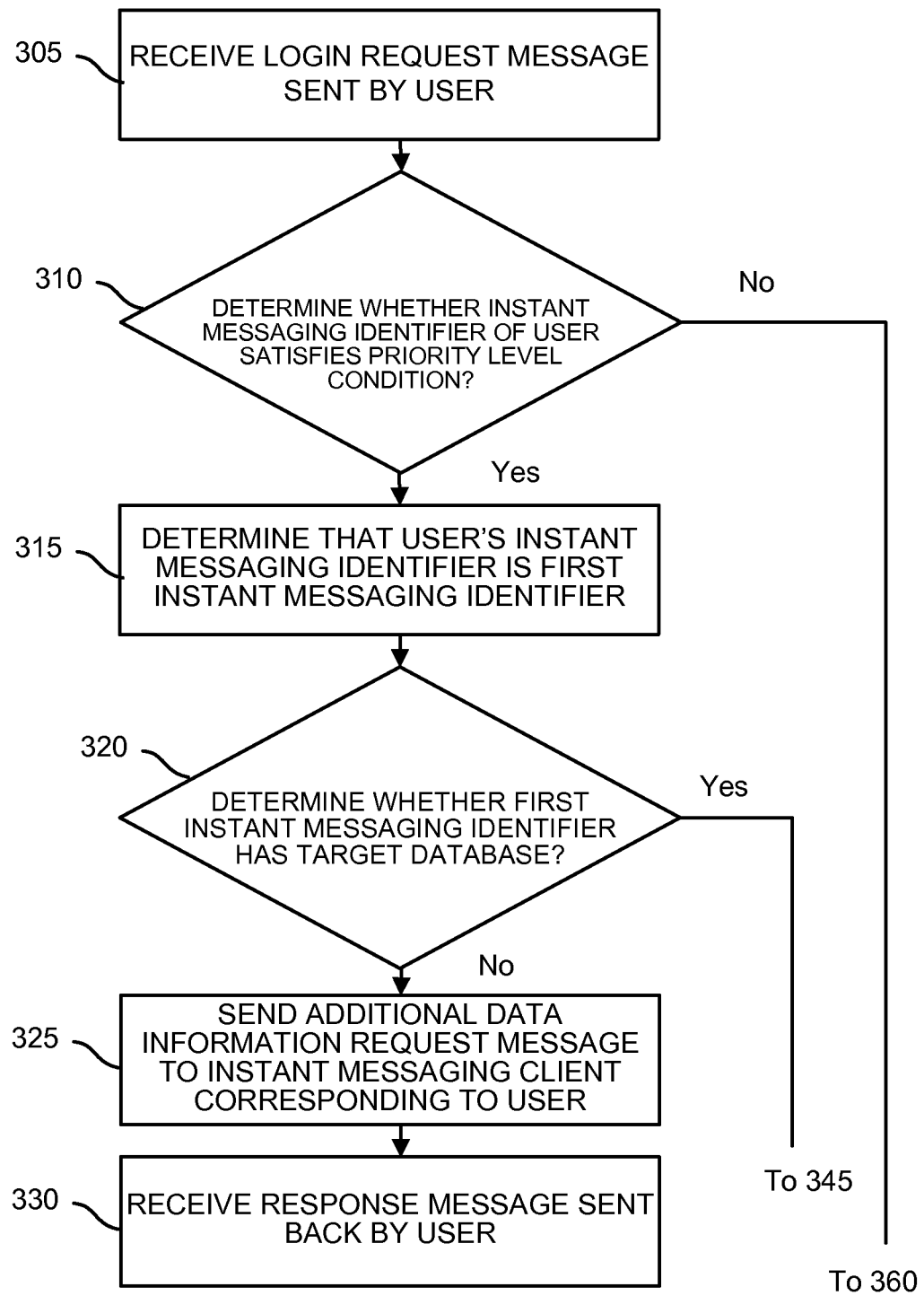
FIGS. 3A, 3B and 3C are a flowchart illustrating a second embodiment of a method for pushing information.
Figure 3B:
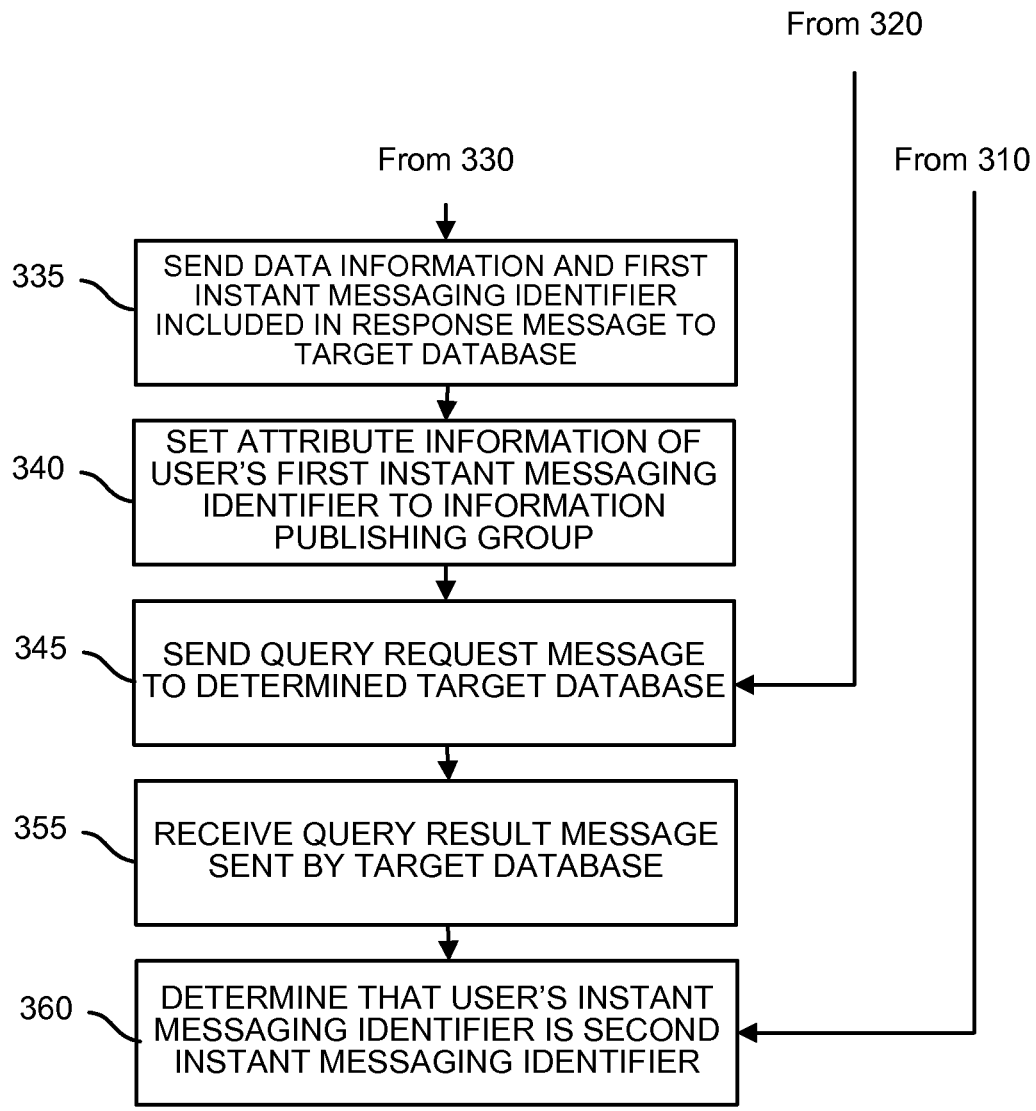
Figure 3C:
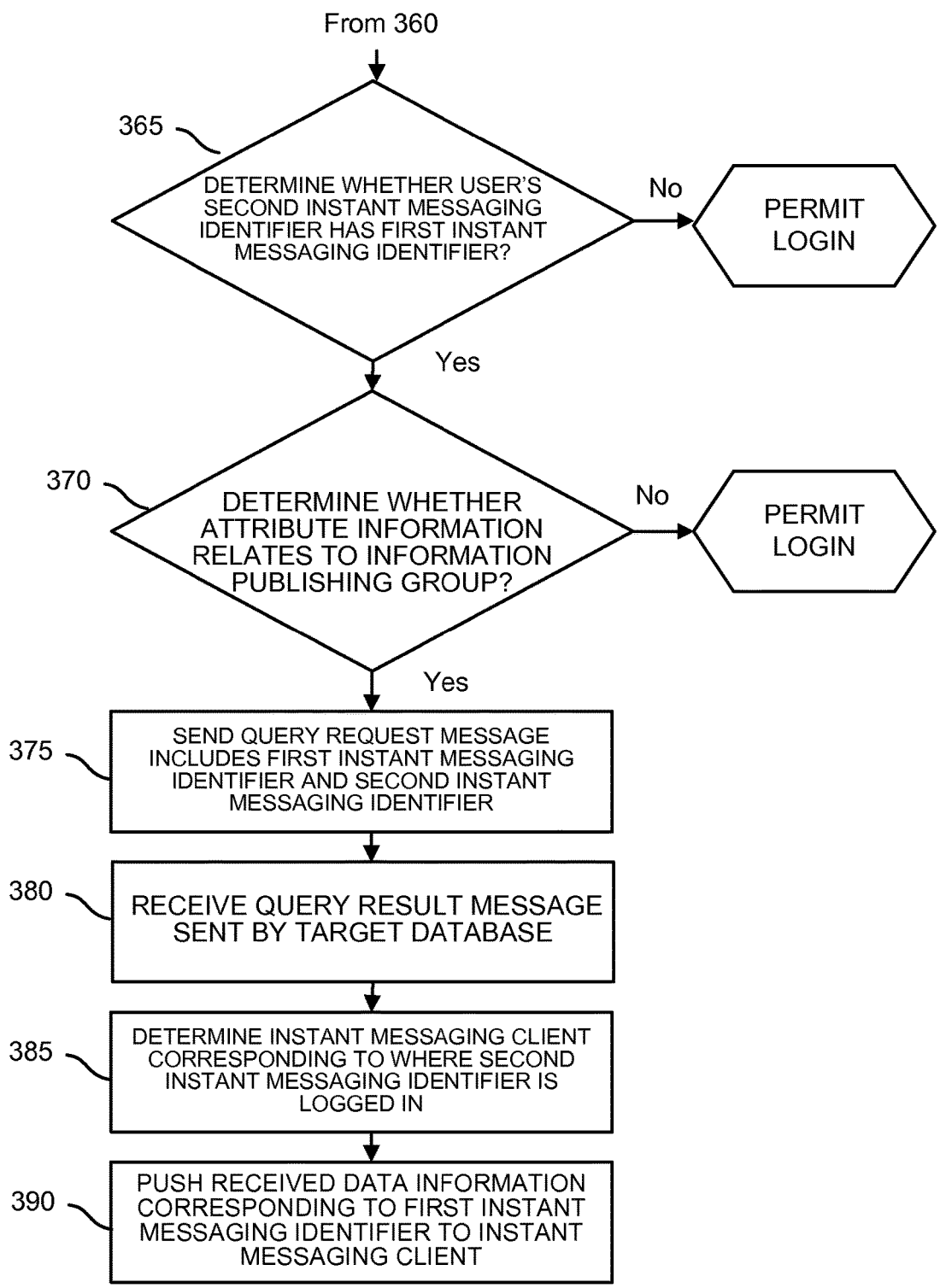

FIGS. 3A, 3B and 3C are a flowchart illustrating a second embodiment of a method for pushing information. In some embodiments, the method 300 is implemented by an instant messaging server 910 of FIG. 9 and includes:

In 305, the instant messaging server receives a login request message sent by a user via an instant messaging client. In some embodiments, the login request message that is generated by the instant messaging client includes the user's instant messaging identifier.

In some embodiments, the user's instant messaging identifier includes a first instant messaging identifier and a second instant messaging identifier. For example, the user's first instant messaging identifier is the instant messaging identifier of the group host user and the second instant messaging identifier is the instant messaging identifier of a group member. In some embodiments, the first instant messaging identifier corresponds to a plurality of second instant messaging identifiers.

In group communication technologies, the instant messaging server divides instant messaging identifiers into first instant messaging identifiers and second instant messaging identifiers. In some embodiments, the majority of users first request and obtain second instant messaging identifiers (e.g., a group member). In some embodiments, users, who successfully request the second instant messaging identifiers, are called ordinary users. When an ordinary user satisfies conditions set by the instant messaging server (e.g., whether the ordinary user has a registered electronic shop with an e-commerce platform), the ordinary user can request a first instant messaging identifier. A user having the first instant messaging identifier is a group host user. At this point, the instant messaging server locally establishes correspondences between the user's first instant messaging identifier and the second instant messaging identifiers. Other users can also request to establish a correspondence with the first instant messaging identifier of the group host user. In other words, the second instant messaging identifiers of a plurality of users are organized into a group using the first instant messaging identifier. Correspondences are established between the first instant messaging identifier and the plurality of second instant messaging identifiers.

For example, User A applies to an instant messaging server operated by an e-commerce company such as Ali Wangwang™ for an instant messaging identifier. The Ali Wangwang™ instant messaging server determines whether User A has registered electronic shop information. In the event that User A has registered electronic shop information, the Ali Wangwang™ instant messaging server assigns a first instant messaging identifier (e.g., a group host user identifier) to User A and grants User A authority to establish a group. In the event that User A does not have registered electronic shop information, the Ali Wangwang instant messaging server assigns a second instant messaging identifier (e.g., an ordinary user identifier) to User A. Other users also having been assigned second instant messaging identifiers can apply to the group corresponding to User A to become group members of the group. In one example, User A is assigned a first instant messaging identifier regardless of whether User A has an electronic shop. In another example, the other users can join the group established by User A based on communication relationships established with User A, such as a friendship that was already established or by adding each other as friends, etc. The Ali Wangwang instant messaging server stores the correspondences between the first instant messaging identifier of User A and the second instant messaging identifiers of a plurality of users.

In 310, the instant messaging server determines whether the instant messaging identifier of the user satisfies a set priority level condition. In the event that the instant messaging identifier of the user satisfies the set priority level condition, control is passed to 315. In the event that the instant messaging identifier of the user does not satisfy the set priority level condition, control is passed to 360.

As an example, after receiving the login request message sent by the user, the instant messaging server verifies the validity of the instant messaging identifier included in the received login request. Moreover, upon login authentication of the user, the instant messaging server determines whether the priority level condition of the user's instant messaging identifier exceeds a predetermined threshold.

In some embodiments, an existing login authentication mode is used for validation. The validation includes determining whether the user's instant messaging identifier is an instant messaging identifier of a valid user.

In some embodiments, the set priority level condition is determined based on a service level recorded in the instant messaging server for the user's instant messaging identifier. Examples of service levels include L1, L2, and L3 where service level L1 corresponds with VIP service. In some embodiments, the set priority level condition is determined based on actual need.

For example, the priority level is an authority set for the user's instant messaging identifier when the instant messaging server assigns the instant messaging identifier to the user. In some embodiments, the granted authority is associated with the instant messaging identifier used by the user. In some embodiments, the authority is expressed as a priority level. For example, a user's instant messaging identifier is classified as a first instant messaging identifier, and the user's instant messaging identifier comes with the authority to set up a group or publish merchandise information, etc. In some embodiments, a user's instant messaging identifier is classified as a second instant messaging identifier in order to classify the user as an ordinary user with ordinary messaging authority.

In the embodiments, the instant messaging identifier of a group host user is defined as a first instant messaging identifier, and the instant messaging identifier of an ordinary user is defined as a second instant messaging identifier.

In the event that the user's instant messaging identifier satisfies the priority level condition, the instant message server determines the user's instant messaging identifier as a first instant messaging identifier. In the event that the user's instant messaging identifier does not satisfy the priority level condition, the instant message server determines the user's instant messaging identifier as a second instant messaging identifier.

In 315, the instant message server determines that the user's instant messaging identifier is a first instant messaging identifier.

In 320, the instant messaging server determines whether the received first instant messaging identifier has corresponding data information in a target database, based on a locally stored correspondence between first instant messaging identifiers and target databases. The locally stored correspondence is stored in the instant messaging server. In the event that the received first instant messaging identifier has corresponding data information in a target database, control is passed to 345. In the event that the received first instant messaging identifier does not have corresponding data information in a target database, control is passed to 325.

As an example, the instant messaging server determines whether data information in a target database corresponding to the received first instant messaging identifier exists based on the locally stored correspondences between the first instant messaging identifiers and target databases. In the event that the instant messaging server determines that data information in a target database corresponding to the received first instant messaging identifier exists, the instant messaging server determines that merchandise information to-be-published stored at the instant messaging server for the first instant messaging identifier exists. In the event that the instant messaging server determines that data information in a target database corresponding to the received first instant messaging identifier does not exist, the instant messaging server sends an additional data information request message to the user regarding whether merchandise information to-be-published is to be added.

In 325, the instant messaging server sends an additional data information request message to the instant messaging client corresponding to the user.

In the event that the instant messaging server determines that merchandise information to-be-published stored at the instant messaging server corresponding to the first instant messaging identifier does not exist, the instant messaging server pushes an additional data information request message to the user's instant messaging client. The additional data information request message is used to ask the user whether the merchandise information to-be-published is to be added at the instant messaging server.

In some embodiments, the additional data information request message is presented in the form of a dialog box in the user's instant messaging client. In some embodiments, a trigger button is added to a predetermined position in the user's instant messaging client.

In 330, the instant messaging server receives a response message sent back by the user.

The response message includes additional data information and the first instant messaging identifier.

In some embodiments, in the event that the additional data information request message is presented in the form of a dialog box in the user's instant messaging client, a user confirmation is regarded as an agreement to acquire additional data information, and closing the dialog box is regarded as a refusal to acquire additional data information.

In some embodiments, in the event that the additional data information request message is presented as a trigger button added to a confirmed position in the user's instant messaging client, the triggering of the trigger button by the user is regarded as agreement to acquire additional data information.

In the event that the user agrees to the additional data information, the modes whereby the instant messaging server acquires data information added by the user include at least the following modes:

A first mode for acquiring data information includes: generating the response message to include the merchandise information to-be-published by the user and the first instant messaging identifier, and sending the response message back to the instant messaging server.

A second mode for acquiring data information includes: after the instant messaging server receives the agreement to acquire additional data information sent back by the user, the instant messaging server determines the user's electronic shop information based on the user's registration information at the instant messaging server. An example of additional data information includes merchandise information. The instant messaging server sets the default for the electronic shop information relating to the user to the data information to be published.

In 335, upon receiving the determined additional data information response message, the instant messaging server sends the data information and the first instant messaging identifier included in the response message to the target database, and locally stores the correspondence between the first instant messaging identifier and the target database.

In the event that the instant messaging server acquires data information that the user is to add, the instant messaging server selects a target database for the data information and locally stores a correspondence between the first instant messaging identifier and the selected target database, and sends the first instant messaging identifier and the data information to the target database. The target database stores the data information and stores the correspondence between the first instant messaging identifier and the data information.

In the event that the instant messaging server receives a response message indicating that data information is not to be added, the user is permitted to login after the first instant messaging identifier of the user has been authenticated.

In 340, the instant messaging server sets an attribute information of the user's first instant messaging identifier to an information publishing group.

After the instant messaging server locally stores the correspondence between the first instant messaging identifier and the target database, the instant messaging server sends to the user's instant messaging client an upgrade message regarding whether the attribute information of the user's first instant messaging identifier is to be set to the information publishing group. In the event that the user confirms that the attribute information for the user's first instant messaging identifier is to be set to the information publishing group, the instant messaging server locally sets the attribute information of the user's first instant messaging identifier to the information publishing group, and looks up second instant messaging identifiers corresponding to the first instant messaging identifier. In some embodiments, the second instant messaging identifiers have online status indicating whether the user is online. In some embodiments, the instant messaging server sends a group upgrade message including the first instant messaging identifier to the instant messaging clients corresponding to the looked up second instant messaging identifiers.

In 345, the instant messaging server sends a query request message to the determined target database.

The query request message includes the user's first instant messaging identifier.

After the target database receives the query request message including the user's first instant messaging identifier, the target database looks up the data information corresponding to the user's first instant messaging identifier and sends a query result message back to the instant messaging server.

The target database looks up the data information corresponding to the user's first instant messaging identifier based on the stored correspondence between the first instant messaging identifier and the data information, regards the looked up data information and user's first instant messaging identifier as a query result message, and sends the query result message to the instant messaging server.

In 355, the instant messaging server receives a query result message sent by the target database, determines an instant messaging client for pushing information based on the included user's first instant messaging identifier, and pushes the data information to the determined instant messaging client.

In 360, the instant messaging server determines that the user's instant messaging identifier is a second instant messaging identifier.

In 365, the instant messaging server determines whether the received user's second instant messaging identifier has a corresponding first instant messaging identifier based on the locally stored correspondence between the first instant messaging identifier and the second instant messaging identifier. In the event that the instant messaging server determines that the received user's second instant messaging identifier has a corresponding first instant messaging identifier, control passes to 370. In the event that the instant messaging server determines that the received user's second instant messaging identifier does not have a corresponding first instant messaging identifier, after the validity of the user's second instant messaging identifier is validated, the instant messaging server permits the user to login. If the user's second instant messaging identifier does not have a corresponding first instant messaging identifier, the user can also log into the server. However, the user cannot receive product information.

In 370, in the event that the instant messaging server determines that the received user's second instant messaging identifier has a corresponding first instant messaging identifier, the instant messaging server determines whether the attribute information of the first instant messaging identifier corresponding to the received user's second instant messaging identifier relates to an information publishing group. In the event that the attribute information of the first instant messaging identifier corresponding to the received user's second instant messaging identifier relates to an information publishing group, control is passed to 375. In the event that the attribute information of the first instant messaging identifier corresponding to the received user's second instant messaging identifier does not relate to an information publishing group, the user is permitted to log into the instant messaging server. The information publishing group is a group which can publish advertisements or promotion information. In other words, the group host user (shop owner) publishes the advertisements or the promotion information.

In 375, the instant messaging server sends a query request message including the first instant messaging identifier and the second instant messaging identifier to the target database.

In the event that the instant messaging server determines that the second instant messaging identifier corresponds to a plurality of first instant messaging identifiers, the instant messaging server first determines a plurality of target databases based on correspondences between the first instant messaging identifiers and the target databases. The instant messaging server then includes the first instant messaging identifiers and the second instant messaging identifier in a query request message and sends the query request message to the corresponding target databases.

In the event that the search results sent by the instant messaging server include one second instant messaging identifier corresponding to one first instant messaging identifier, the instant messaging server first determines the target database based on the correspondence between the first instant messaging identifier and the target database. The instant messaging server then includes the first instant messaging identifier and the second instant messaging identifier in a query request message and sends the query request message to the corresponding target database.

In 380, the instant messaging server receives a query result message sent by the target database. The query result message includes the second instant messaging identifier and data information corresponding to the first instant messaging identifier.

In 385, the instant messaging server determines the instant messaging client corresponding to where the second instant messaging identifier is logged in based on the included second instant messaging identifier.

In 390, the instant messaging server pushes the received data information corresponding to the first instant messaging identifier to the instant messaging client where the determined second instant messaging identifier is logged in.

In the event that the instant messaging server determines that more than one target database exists, the instant messaging server is to receive more than one query results from the target databases. The more than one query results include the same second instant messaging identifier. Therefore, the instant messaging server determines the instant messaging client based on the second instant messaging identifier and pushes the different data information in the more than one query results to the determined instant messaging client.

Figure 4A:
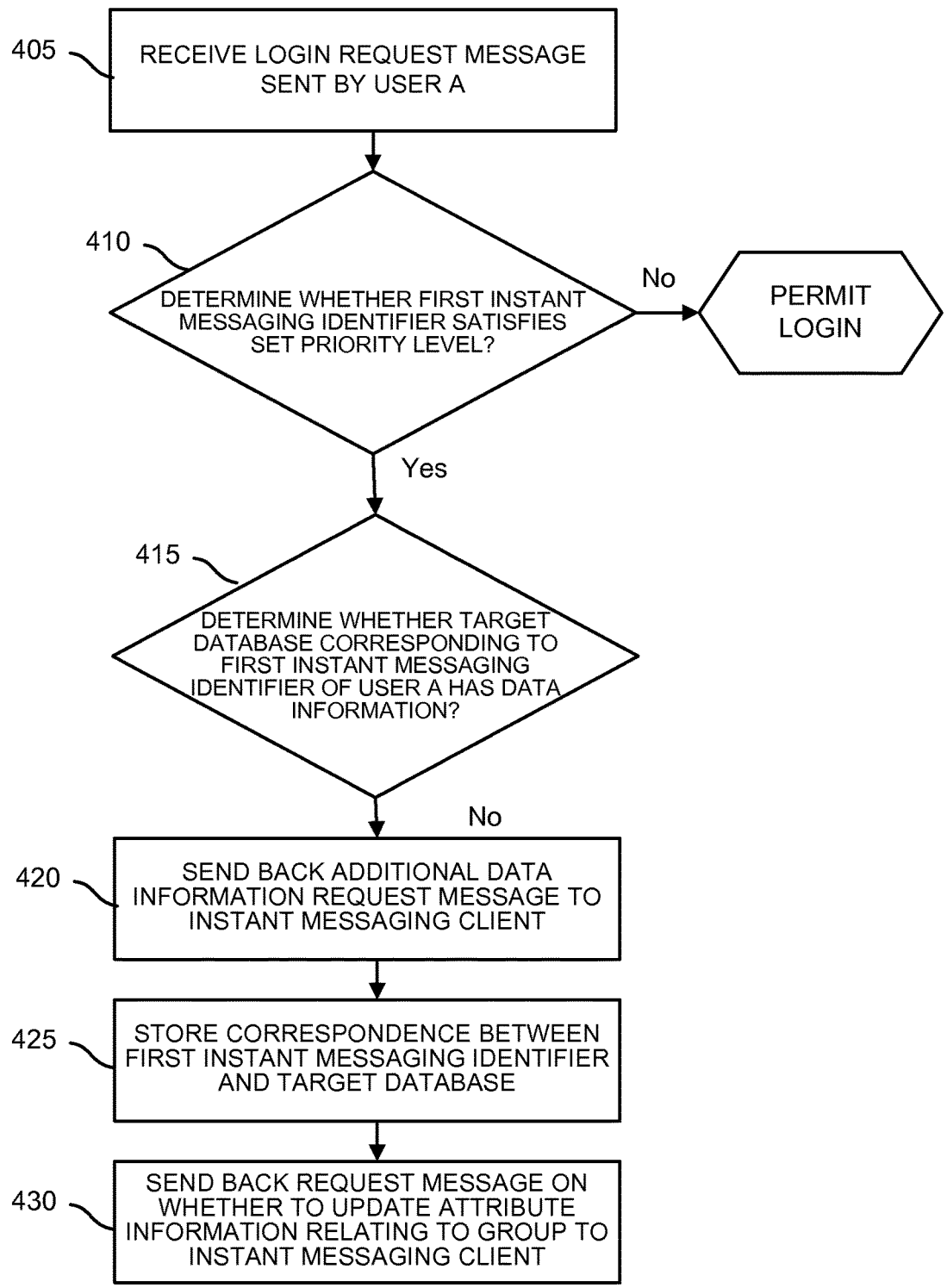
FIGS. 4A and 4B are a flowchart illustrating a third embodiment of a method for pushing information.
Figure 4B:
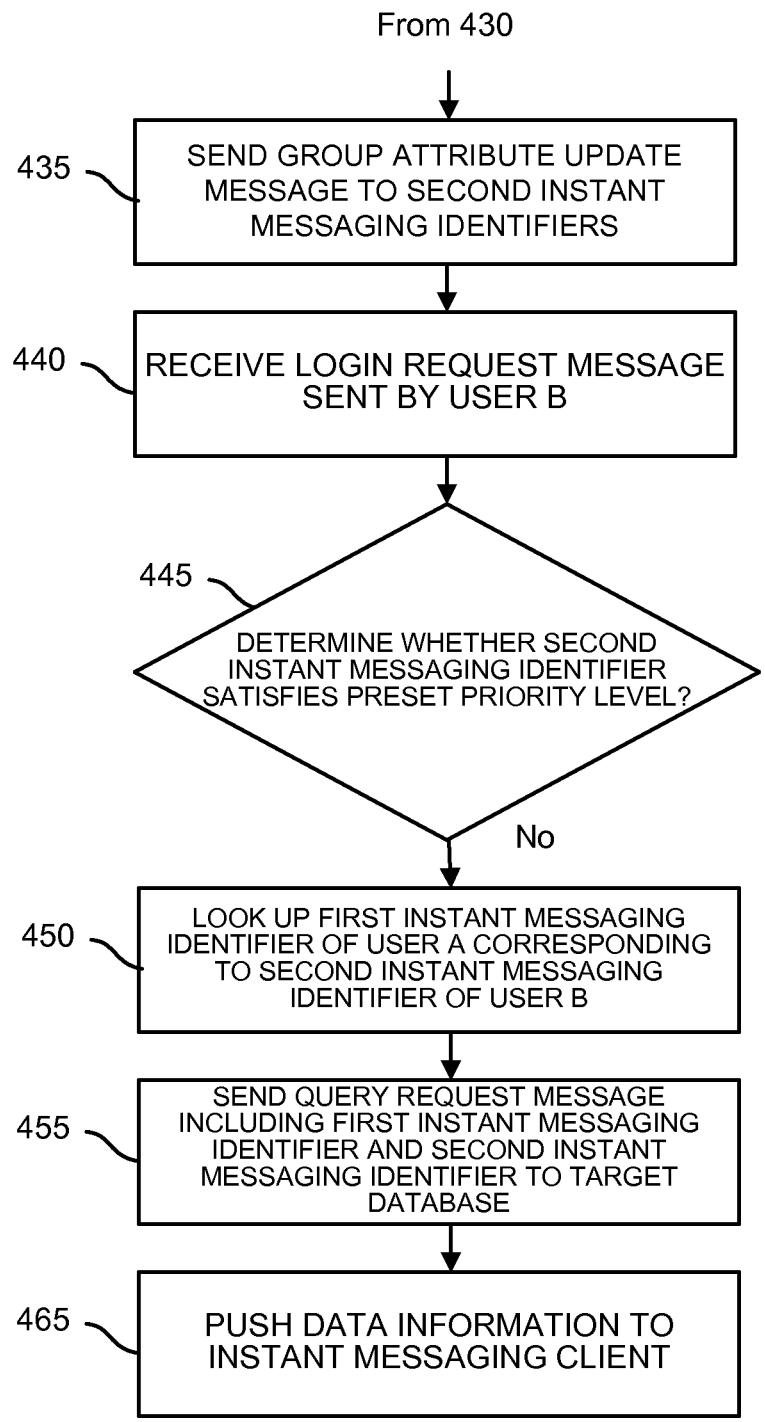

FIGS. 4A and 4B are a flowchart illustrating a third embodiment of a method for pushing information. In this example, the instant messaging server assumes that User A's instant messaging identifier is a first instant messaging identifier, User B's instant messaging identifier is a second instant messaging identifier, and User B and User A belong to the same group. In some embodiments, the method 400 is implemented by an instant messaging server 910 of FIG. 9 and includes:

In 405, the instant messaging server receives a login request message sent by User A, and the login request message includes a first instant messaging identifier.

The instant messaging server authenticates the first instant messaging identifier of User A after receiving the login request message.

In 410, in the event that the first instant messaging identifier of User A passes authentication, the instant messaging server determines whether the received first instant messaging identifier satisfies a set priority level. In the event that the received first instant messaging identifier satisfies a set priority level, control passes to 415. In the event that the received first instant messaging identifier does not satisfy the set priority level, the instant messaging server permits User A to log into the instant messaging server.

In 415, the instant messaging server determines whether a target database corresponding to the first instant messaging identifier of User A has data information based on a preset correspondence between the first instant messaging identifier and the target database. In the event that the target database corresponding to the first instant messaging identifier of User A does not have the data information, control passes to 420.

In 420, the instant messaging server sends back an additional data information request message to an instant messaging client corresponding to User A and receives a response message sent back from the instant messaging client.

In 425, the instant messaging server locally stores the correspondence between the first instant messaging identifier and the target database based on the data information included in the response message.

In 430, the instant messaging server sends back a request message on whether to update an attribute relating to a group established by the instant messaging client corresponding to User A and receives an update response message from the instant messaging client corresponding to User A.

Upon receiving the update response message, the instant messaging server changes the attribute relating to the group established by User A to an information publishing group.

In 435, the instant messaging server sends a group attribute update message including the first instant messaging identifier to the online second instant messaging identifiers.

The instant messaging server first determines the second instant messaging identifiers corresponding to the first instant messaging identifier based on the stored correspondence between the first instant messaging identifier and the second instant messaging identifiers.

Then the instant messaging server determines whether the determined second instant messaging identifiers are online and sends the group attribute update message containing the first instant messaging identifier to the online second instant messaging identifiers.

In 440, the instant messaging server receives a login request message sent by User B, and the login request message includes a second instant messaging identifier.

In 445, the instant messaging server determines whether the received second instant messaging identifier satisfies a preset priority level. In the event that the received second instant messaging identifier does not satisfy the preset priority level, control is passed to 450.

In 450, the instant messaging server looks up the first instant messaging identifier of User A corresponding to the second instant messaging identifier of User B based on the locally stored correspondence between the first instant messaging identifier and the second instant messaging identifier. In some embodiments, correspondence relationships between the group host user and the group members are established when the groups are established.

In 455, the instant messaging server sends a query request message including the first instant messaging identifier and the second instant messaging identifier to the target database.

The instant messaging server determines the target database corresponding to the first instant messaging identifier based on the locally stored correspondence between an instant messaging identifier and the target database, and sends a query request message to the determined target database.

The target database looks up the data information corresponding to the first instant messaging identifier included in the query request message based on the received query request message, and includes the data information in a query result and sends the query result back to the instant messaging server.

In some embodiments, the query result includes the first instant messaging identifier, the second instant messaging identifier, and the data information.

In 465, after the instant messaging server receives the query result sent back by the target database, the instant messaging server pushes the data information included in the query result to the instant messaging client.

As an example, when the instant messaging server receives the query result message sent back by the target database, the instant messaging server first determines the instant messaging client corresponding to User B based on the second instant messaging identifier in the query result. Then, the instant messaging server pushes the data information included in the query result to the instant messaging client corresponding to User B.

The above method displays the merchandise information that User A is going to publish on the instant messaging client corresponding to User B, and avoids inefficiencies associated with conventional manual editing and publishing of information.

Figure 5:
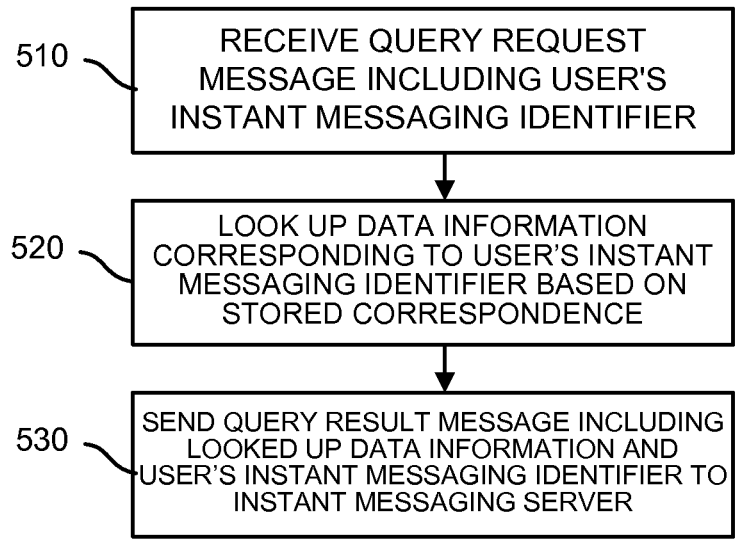
FIG. 5 is a flowchart illustrating an embodiment of a method for querying information.

FIG. 5 is a flowchart illustrating an embodiment of a method for querying information. In some embodiments, the method 500 is implemented by a target database 930 of FIG. 9 and includes:

In 510, the target database receives a query request message including a user's instant messaging identifier from an instant messaging server.

In 520, the target database looks up data information corresponding to the user's instant messaging identifier based on a stored correspondence between the user's instant messaging identifier and the data information.

In some embodiments, in the event that the data information contains URL address information, the URL address information of the data information is determined based on the stored correspondence between the user's instant messaging identifier and the data information, and data content contained in the determined URL address information is regarded as the data information corresponding to the user's instant messaging identifier.

In 530, the target database sends a query result message including the looked up data information and the user's instant messaging identifier to the instant messaging server.

In some embodiments, in the event that a user registers with the instant messaging server, the instant messaging server establishes a correspondence between a user-registered electronic shop information and the user's instant messaging identifier and stores the correspondence in a target database. In some embodiments, the electronic shop information at the time of user registration serves as default merchandise information to be published.

Figure 6:
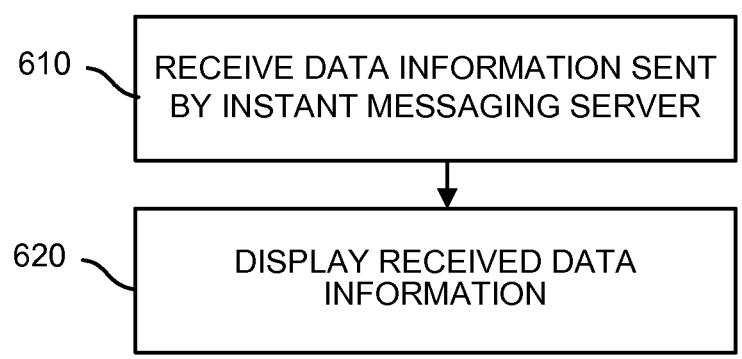
FIG. 6 is a flowchart illustrating an embodiment of a method for displaying information.

FIG. 6 is a flowchart illustrating an embodiment of a method for displaying information. In some embodiments, the method 600 is implemented by an instant messaging client 920 of FIG. 9 and includes:

In 610, the instant messaging client receives data information sent by an instant messaging server.

In 620, the instant messaging client displays the received data information.

Figure 7A:
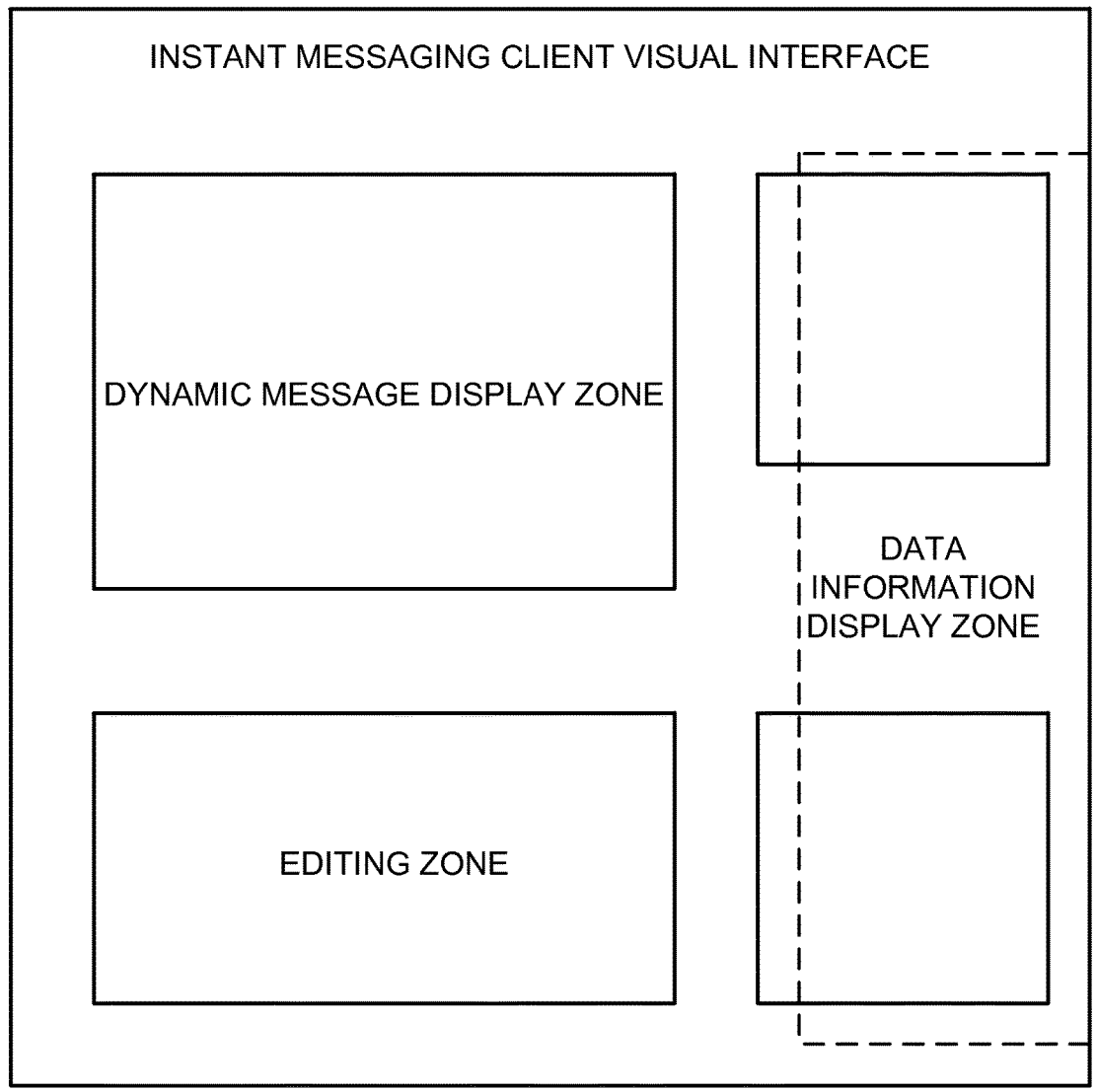
FIGS. 7A and 7B are diagrams illustrating an embodiment of data information displayed on an instant messaging client.

In some embodiments, when the instant messaging server sends the data information to the instant messaging client, a fifth display zone is generated on a visual interface of the instant messaging client. In some embodiments, the fifth display zone is displayed at the top of the visual interface of the instant messaging client. In some embodiments, the fifth display zone is displayed on a side of the visual interface of the instant messaging client. In some embodiments, the size of the fifth display is adjusted according to the amount of data information to be displayed or as needed by the instant messaging client. FIGS. 7A and B are diagrams illustrating an embodiment of data information displayed on an instant messaging client.

In the event that the data information pushed by the instant messaging server is not the only data information corresponding to the first instant messaging identifier, display forms include paginated display method, split screen display, or other forms of display.

In FIG. 7A, the data information display zone replaces the bulletin board zone and the group member information display zone of FIG. 1.

Figure 7B:
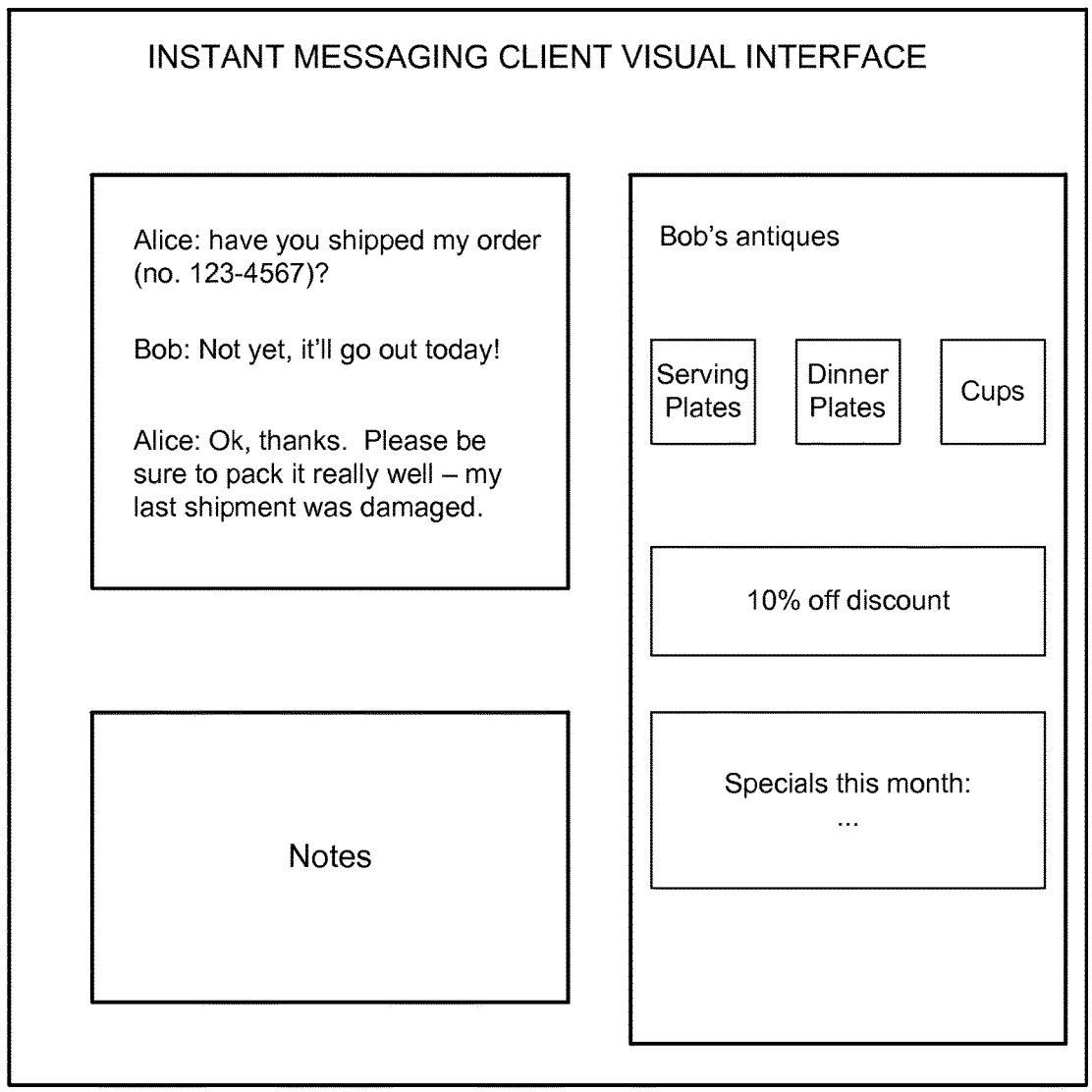

In FIG. 7B, the dynamic message display zone displays a standard instant messaging session between Alice and Bob. Bob is a group host user who has linked the URL to his electronic shop ("Bob's antiques") as the data information to be published. Thus, the right-side of the visual interface displays a data information display zone displaying the webpage corresponding to Bob's antiques, which displays merchandise information relating to serving plates, dinner plates, and cups, a button to get a 10% off discount, and specials this month.

Figure 8:
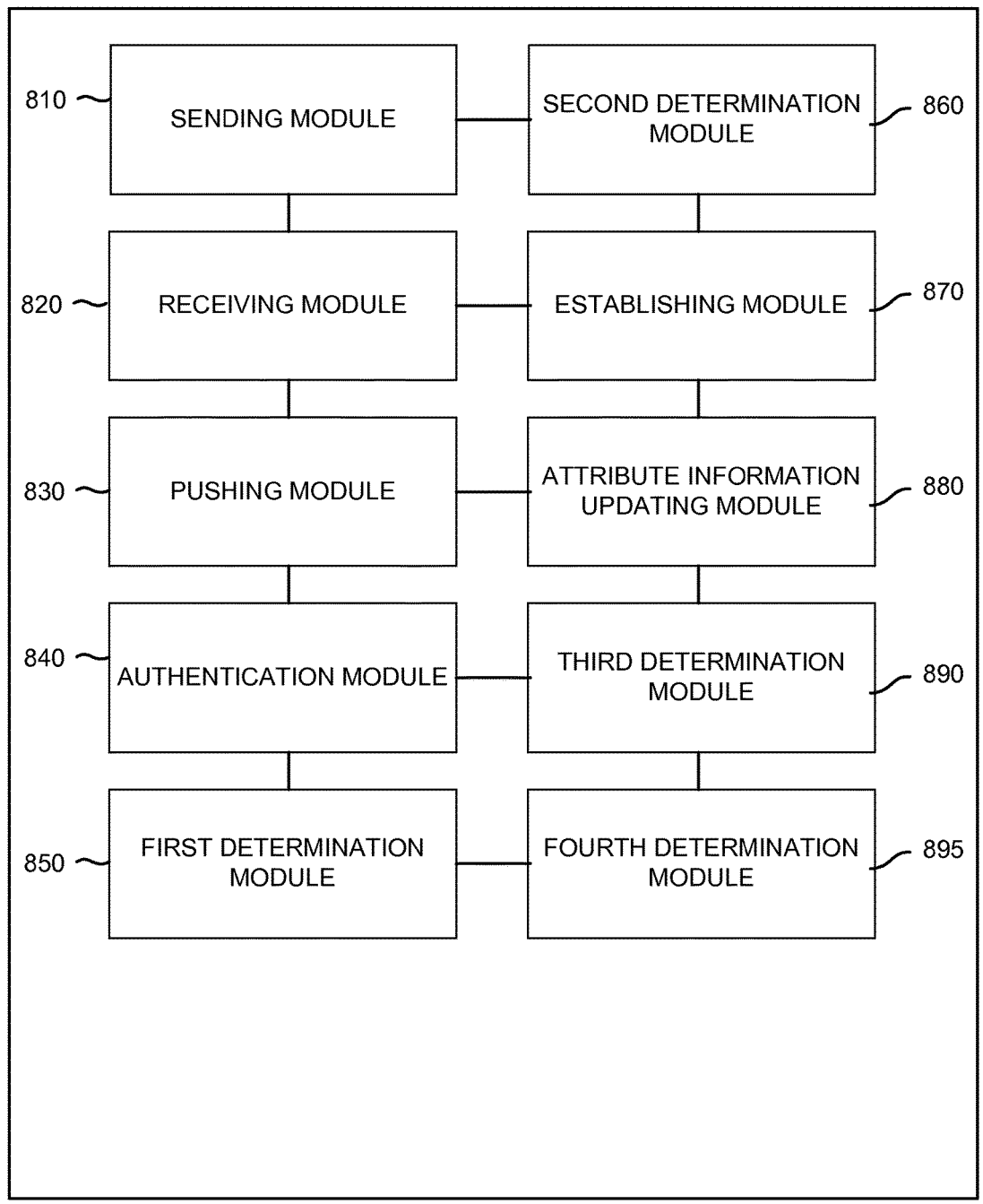
FIG. 8 is a structural diagram illustrating an embodiment of an instant messaging server.

FIG. 8 is a structural diagram illustrating an embodiment of an instant messaging server. In some embodiments, the instant messaging server 800 includes a sending module 810, a receiving module 820, and a pushing module 830.

The sending module 810 sends a query request message including a user's instant messaging identifier to a target database.

The receiving module 820 receives a query result message sent by the target database, the query result message including data information corresponding to the user's instant messaging identifier.

The pushing module 830 determines an instant messaging client for pushing the data information based on the user's instant messaging identifier, and pushes the data information to the determined instant messaging client.

The data information was looked up in the target database based on a stored correspondence between the user's instant messaging identifier and the data information.

In some embodiments, the instant messaging server 800 further includes an authentication module 840 and a first determination module 850.

Before a query request message including the user's instant messaging identifier is sent to the target database, the authentication module 840 receives a login request message including the user's instant messaging identifier sent by the user, and authenticates the received instant messaging identifier.

When the received instant messaging identifier has been authenticated, the first determination module 850 determines whether the user's instant messaging identifier satisfies a set priority level condition.

In the event that the user's instant messaging identifier satisfies the set priority level condition, the first determination module 850 determines the user's instant messaging identifier as a first instant messaging identifier. In the event that the user's instant messaging identifier does not satisfy the set priority condition, the first determination module 850 determines the user's instant messaging identifier as a second instant messaging identifier.

In some embodiments, the instant messaging server further includes a second determination module 860.

The second determination module 860 determines whether the first instant messaging identifier that was received has a corresponding target database based on the locally stored correspondence between the first instant messaging identifier and the target database.

In the event that the first determination module 850 determines that the first instant messaging identifier has a target database, the first determination module 850 sends a query request message including the user's first instant messaging identifier to the target database. In the event that the first determination module 850 determines that the first instant messaging identifier does not have a target database, the first determination module 850 sends a request message to the instant messaging client relating to the user for additional data information.

In some embodiments, the instant messaging server further includes an establishing module 870.

The establishing module 870 receives a response message sent back by the instant messaging client relating to the user after an additional data information request message is sent to the instant messaging client relating to the user. The response message includes the additional data information and the first instant messaging identifier. When the response message is received, the included data information and first instant messaging identifier are sent to a target database, and the correspondence between the first instant messaging identifier and the target database is locally stored.

In some embodiments, the instant messaging server includes an attribute information updating module 880.

The attribute information updating module 880 sets attribute information of the user's first instant messaging identifier to an information publishing group.

In some embodiments, the receiving module 820 determines the target database corresponding to the received user's first instant messaging identifier based on the locally stored correspondence between the first instant messaging identifier and the target database, and sends a query request message to the determined target database. In some embodiments, the query request message includes the user's first instant messaging identifier.

In some embodiments, the instant messaging server includes a third determination module 890 and a fourth determination module 895.

In the event that the first determination module 850 determines the user's instant messaging identifier as a second instant messaging identifier, and before sending the query request message including the user's instant messaging identifier to the target database, the third determination module 890 determines whether the received user's second instant messaging identifier has a corresponding first instant messaging identifier based on the locally stored correspondence between the first instant messaging identifier and the second instant messaging identifier. In the event that the third determination module 890 determines that the received user's second instant messaging identifier does not have a corresponding first instant messaging identifier, the third determination module 890 permits the user to log onto the instant messaging server 800.

In the event that the second determination module 860 determines that the first instant messaging identifier exists, the fourth determination module 895 determines whether the attribute information of the first instant messaging identifier corresponding to the received user's second instant messaging identifier is an information publishing group, and in the event that the attribute information of the first instant messaging identifier is the information publishing group, the sending module 810 is triggered. In the event that the attribute information of the first instant messaging identifier is not the information publishing group, the user is permitted to log onto the instant messaging server.

The receiving module 820 receives a query result message which was sent by the target database and which contains a second instant messaging identifier and data information corresponding to the first instant messaging identifier.

The pushing module 830 determines whether the instant messaging client for pushing information is the instant messaging client where the second instant messaging identifier is logged in based on the included second instant messaging identifier, and pushing the received data information corresponding to the first instant messaging identifier to the instant messaging client corresponding to the second instant messaging identifier.

Figure 9:
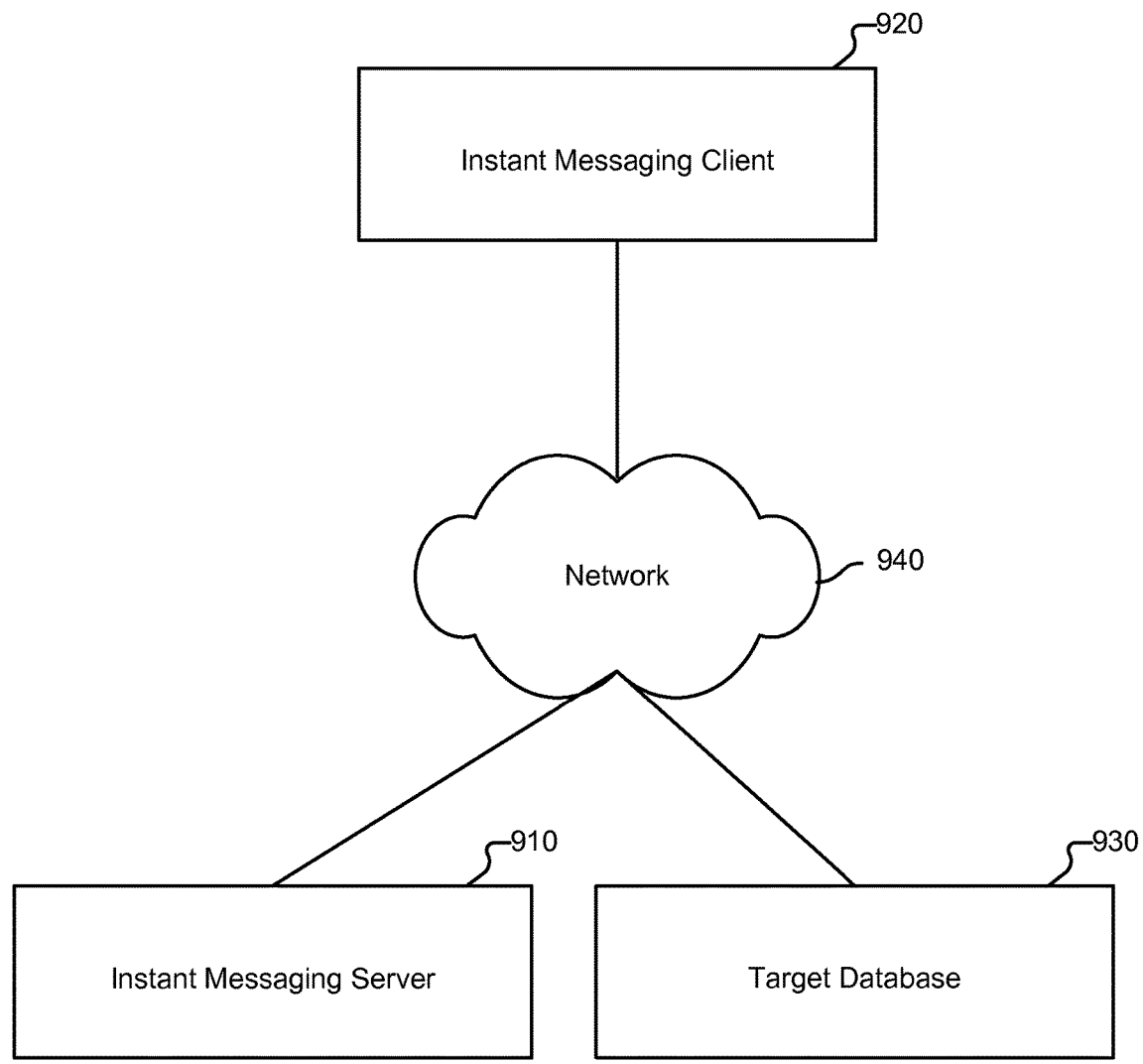
FIG. 9 is a structural diagram illustrating an embodiment of a system for pushing information.

FIG. 9 is a structural diagram illustrating an embodiment of a system for pushing information. In some embodiments, the system 900 comprises an instant messaging server 910, an instant messaging client 920, and a target database 930 connected to each other via a network 940.

The instant messaging server 910 sends a query request message including a user's instant messaging identifier to a target database, and receives a query result message including data information corresponding to the user's instant messaging identifier sent by the target database. The instant messaging server 910 determines the instant messaging client 920 for pushing data information based on the user's instant messaging identifier, and pushes the data information to the determined instant messaging client 920.

The target database 930 looks up the data information corresponding to the user's instant messaging identifier based on a stored correspondence between the user's instant messaging identifier and the data information, and sends the query result message to the instant messaging server 910.

The instant messaging client 920 receiving the data information pushed by the instant messaging server 910 and displays the data information.

In some embodiments, before the query request message including the user's instant messaging identifier is sent to the target database 930, the instant messaging server 910 receives a login request message including the user's instant messaging identifier sent by the user's instant messaging client, and authenticates the received user's instant messaging identifier.

Upon authentication of the received user's instant messaging identifier, the instant messaging server 910 determines whether the user's instant messaging identifier satisfies a set priority level condition.

In the event that the user's instant messaging identifier satisfies the set priority level condition, the instant messaging server 910 determines the user's instant messaging identifier as a first instant messaging identifier. In the event that the user's instant messaging identifier does not satisfy the set priority level condition, the instant messaging server 910 determines the user's instant messaging identifier as a second instant messaging identifier.

The instant messaging server 910 determines whether the first instant messaging identifier that was received has a corresponding target database based on a locally stored correspondence between the first instant messaging identifier and the target database.

In the event that the received first instant messaging identifier has a corresponding target database, the instant messaging server 910 sends a query request message including the user's first instant messaging identifier to the target database. In the event that the received first instant messaging identifier does not have a corresponding target database, the instant messaging server 910 sends a request message to the user for additional data information.

The instant messaging server 910 receives a response message sent back by the instant messaging client relating to the user after an additional data information query message is sent to the instant messaging client relating to the user. The response message includes the additional data information and the first instant messaging identifier, and when the response message is received, the included data information and first instant messaging identifier are sent to a target database, and a correspondence between the first instant messaging identifier and the target database is locally stored.

The instant messaging server 910 sets attribute information of the user's first instant messaging identifier to an information publishing group.

As an example, the instant messaging server 910 determines the target database corresponding to the received user's first instant messaging identifier based on the locally stored correspondence between the first instant messaging identifier and the target database, and sends a query request message to the determined target database. The query request message includes the user's first instant messaging identifier.

In the event that the instant messaging server 910 determines the user's instant messaging identifier as a second instant messaging identifier, and before sending the query request message including the user's instant messaging identifier to the target database, the instant messaging server 910 determines whether the received user's second instant messaging identifier has a corresponding first instant messaging identifier based on the locally stored correspondence between the first instant messaging identifier and the second instant messaging identifier. In the event that the received user's second instant messaging identifier does not have a corresponding first instant messaging identifier, the instant messaging server 910 permits the user to login.

In the event that the instant messaging server 910 determines that the first instant messaging identifier exists, the instant messaging server 910 determines whether the attribute information of the first instant messaging identifier corresponding to the received user's second instant messaging identifier is the information publishing group. In the event that the attribute information is the information publishing group, the instant messaging server 910 sends the query request message including the user's instant messaging identifier to the target database. In the event that the attribute information is not the information publishing group, the instant messaging server 910 permits the user to login.

The instant messaging server 910 receives a query result message which was sent by the target database. The query result message includes a second instant messaging identifier and data information corresponding to the first instant messaging identifier.

The instant messaging server 910 determines that the instant messaging client for pushing information is the instant messaging client where the second instant messaging identifier is logged in based on the included second instant messaging identifier, and pushes the received data information corresponding to the first instant messaging identifier to the instant messaging client corresponding to the second instant messaging identifier.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for pushing information, comprising:
    determining whether a user's instant messaging identifier has a corresponding target database based at least in part on whether there is a stored correspondence between the user's instant messaging identifier and the target database;
    in the event that the user's instant messaging identifier does not have the corresponding target database:
        sending an additional information request to an instant messaging client associated with the user;
        receiving a response message from the instant messaging client, the response message including additional data information and a first instant messaging identifier;
        selecting the target database;
        sending the included additional data information and the first instant messaging identifier to the selected target database; and
        locally storing a correspondence between the first instant messaging identifier and the selected target database;
    in the event that the user's instant messaging identifier has the corresponding target database:
        sending a query request including the user's instant messaging identifier to the target database; and
        receiving a query result from the target database, the query result including data information corresponding to the user's instant messaging identifier;
    determining an instant messaging client to push the data information, the determination being based on the user's instant messaging identifier; and
    pushing the data information to the determined instant messaging client,
    wherein the data information is looked up in the target database based on a stored correspondence between the user's instant messaging identifier and the data information.

2. The method as described in claim 1, further comprising:
    before the sending of the query request:
        receiving a login request sent by the user, the login request including the user's instant messaging identifier;
        determining whether the user's instant messaging identifier is valid;
        in the event that the user's instant messaging identifier is valid:
            determining whether the user's instant messaging identifier satisfies a set priority level condition; and
            in the event that the user's instant messaging identifier satisfies the set priority level condition:
                determining the user's instant messaging identifier as a first instant messaging identifier; and
            in the event that the user's instant messaging identifier does not satisfy the set priority condition:
                determining the user's instant messaging identifier as a second instant messaging identifier.

3. The method as described in claim 2, wherein the determining of the user's instant messaging identifier is the first instant messaging identifier comprises:
    determining whether the received first instant messaging identifier has a corresponding target database based on a stored correspondence between the first instant messaging identifier and the target database; and
    in the event that the received first instant messaging identifier has the corresponding target database:
        sending a query request including the user's first instant messaging identifier to the target database.

4. The method as described in claim 1, further comprising:
    after the storing of the correspondence between the first instant messaging identifier and the target database:
        setting an attribute information of the user's first instant messaging identifier to an information publishing group.

5. The method as described in claim 1, wherein the sending of the query request including the user's instant messaging identifier to the target database includes:
    determining the target database corresponding to the user's first instant messaging identifier based on the stored correspondence between the first instant messaging identifier and the target database; and
    sending the query request to the determined target database, wherein the query request includes the user's first instant messaging identifier.

6. The method as described in claim 2, wherein the determining of the user's instant messaging identifier is the second instant messaging identifier comprises:
    determining whether the user's second instant messaging identifier has a corresponding first instant messaging identifier based on the stored correspondence between the first instant messaging identifier and the second instant messaging identifier; and
    in the event that the user's second instant messaging identifier does not have a corresponding first instant messaging identifier, permitting the user to login.

7. The method as described in claim 6, wherein the determining of whether the user's second instant messaging identifier has the corresponding first instant messaging identifier comprises:
    in the event that the user's second instant messaging identifier has a first instant messaging identifier:
        determining whether an attribute information of the first instant messaging identifier corresponding to the user's second instant messaging identifier is an information publishing group;
        in the event that the attribute information of the first instant messaging identifier corresponding to the user's second instant messaging identifier is the information publishing group:
            sending the query request including the first instant messaging identifier and second instant messaging identifier to the target database; and
        in the event that the attribute information of the first instant messaging identifier corresponding to the user's second instant messaging identifier is not the information publishing group:
    permitting the user to login.

8. The method as described in claim 7, wherein the receiving of the query result including the data information corresponding to the user's instant messaging identifier from the target database comprises:
  receiving the query result sent by the target database, the query result including the second instant messaging identifier and the data information corresponding to the first instant messaging identifier; and
  determining an instant messaging client to push information based on the included instant messaging identifier of the user comprising:
    determining the instant messaging client to push information is the instant messaging client where the second instant messaging identifier is logged in based on the included second instant messaging identifier; and
    pushing the data information to the determined instant messaging client comprising:
      pushing the received data information corresponding to the first instant messaging identifier to the determined instant messaging client where the second instant messaging identifier is logged in.

9. The method as described in claim 1, wherein the instant messaging client associated with the user acquires the additional data information based on generating the response message to include merchandise information to be published by the user and the first instant message identifier, and returning the response message.

10. A method for pushing information, comprising:
  determining whether a user's first instant messaging identifier has a corresponding target database based at least in part on whether there is a stored correspondence between the user's first instant messaging identifier and the target database;
  in the event that the user's instant messaging identifier does not have the corresponding target database:
    sending an additional information request to an instant messaging client associated with the user;
    receiving a response message from the instant messaging client, the response message including additional data information and a first instant messaging identifier;
    selecting the target database;
    sending the included additional data information and the first instant messaging identifier to the selected target database; and
    locally storing a correspondence between the first instant messaging identifier and the selected target database;
  in the event that the user's first instant messaging identifier has the corresponding target database:
    sending a query request including the user's first instant messaging identifier to the target database; and
    receiving a query result from the target database, the query result including data information corresponding to the user's first instant messaging identifier;
  determining an instant messaging client to push information, the determination being based on the first instant messaging identifier; and
  pushing the data information to the determined instant messaging client,
  wherein the data information is looked up in the target database according to a stored correspondence between the user's first instant messaging identifier and the data information.

11. The method as described in claim 10, further comprising:
  before the sending of the query request:
    receiving a login request sent by a user, the login request including the user's first instant messaging identifier;
    determining whether the received instant messaging identifier is valid;
    in the event that the user's instant messaging identifier is valid:
      determining whether the user's first instant messaging identifier satisfies a set priority level condition; and
      in the event that the user's first instant messaging identifier satisfies the set priority level condition:
        sending the query request including the user's first instant messaging identifier to the target database.

12. The method as described in claim 11, wherein the determining of whether the user's first instant messaging identifier satisfies the set priority level condition comprises:
  determining whether the user's first instant messaging identifier has a corresponding target database based on the stored correspondence between the first instant messaging identifier and the target database;
  in the event that the received first instant messaging identifier has the corresponding target database:
    sending a query request including the user's first instant messaging identifier to the target database; and
  in the event that the received first instant messaging identifier does not have the corresponding target database:
    sending the request to the user to request the data information.

13. The method as described in claim 10, further comprising:
  after the storing of the correspondence between the first instant messaging identifier and the target database:
    setting an attribute information of the user's first instant messaging identifier to an information publishing group.

14. The method as described in claim 10, wherein the sending of the query request including the user's first instant messaging identifier to the target database comprises:
  determining the target database corresponding to the user's first instant messaging identifier based on the stored correspondence between the first instant messaging identifier and the target database; and
  sending the query request to the determined target database, wherein the query request includes the user's first instant messaging identifier.

15. A method for pushing information, comprising:
  determining whether a user's first instant messaging identifier has a corresponding target database based at least in part on whether there is a stored correspondence between the user's first instant messaging identifier and the target database;
  in the event that the user's instant messaging identifier does not have the corresponding target database:
    sending an additional information request to an instant messaging client associated with the user;
    receiving a response message from the instant messaging client, the response message including additional data information and a first instant messaging identifier;
    selecting the target database;
    sending the included additional data information and the first instant messaging identifier to the selected target database; and locally storing a correspondence between the first instant messaging identifier and the selected target database;
in the event that the user's first instant messaging identifier has the corresponding target database:
sending a query request including a user's second instant messaging identifier and the user's first instant messaging identifier to a target database, wherein a correspondence between the user's second instant messaging identifier and the user's first instant messaging identifier exists; and
receiving a query result sent by the target database, the query result including the user's second instant messaging identifier and data information corresponding to the user's first instant messaging identifier;
determining an instant messaging client to push information, the determination being based on the user's second instant messaging identifier; and
pushing the data information corresponding to the first instant messaging identifier to the determined instant messaging client,
wherein the data information is looked up in the target database based on a stored correspondence between the first instant messaging identifier and the data information.

16. The method as described in claim 15, further comprising:
before the sending of the query request:
determining whether the user's second instant messaging identifier has a corresponding first instant messaging identifier based on the stored correspondence between the first instant messaging identifier and the second instant messaging identifier;
in the event that the user's second instant messaging identifier does not have the corresponding first instant messaging identifier:
permitting the user to login.

17. The method as described in claim 16, wherein the determining of whether the user's second instant messaging identifier has a corresponding first instant messaging identifier comprises:
in the event that the user's second instant messaging identifier has the corresponding first instant messaging identifier:
determining whether an attribute information of the first instant messaging identifier corresponding to the user's second instant messaging identifier is an information publishing group;
in the event that the attribute information of the first instant messaging identifier corresponding to the user's second instant messaging identifier is the information publishing group:
sending the query request including the user's second instant messaging identifier and the user's first instant messaging identifier to the target database; and
in the event that the attribute information of the first instant messaging identifier corresponding to the user's second instant messaging identifier is not the information publishing group:
permitting the user to login.

18. The method as described in claim 17, wherein the receiving of the query result including the data information corresponding to the user's instant messaging identifier comprises:
receiving the query result sent by the target database, the query result including the second instant messaging identifier and the data information corresponding to the first instant messaging identifier; and
determining an instant messaging client to push information based on the user's instant messaging identifier comprising:
determining the instant messaging client to push information is the instant messaging client where the second instant messaging identifier is logged in based on the included second instant messaging identifier; and
pushing the data information to the determined instant messaging client, the data information corresponding to the first instant messaging identifier to the determined instant messaging client where the second instant messaging identifier is logged in.

19. A method for querying information, comprising:
determining, by an instant messaging server, whether a user's instant messaging identifier has a corresponding target database based at least in part on whether there is a stored correspondence between the user's instant messaging identifier and data information;
in the event that the user's instant messaging identifier does not have the corresponding target database:
sending an additional information request to an instant messaging client associated with the user;
receiving a response message from the instant messaging client, the response message including additional data information and a first instant messaging identifier;
selecting the target database;
sending the included additional data information and the first instant messaging identifier to the selected target database; and
locally storing a correspondence between the first instant messaging identifier and the selected target database;
in the event that the instant messaging server has the stored correspondence between the user's instant messaging identifier and the data information:
receiving a query request sent by the instant messaging server, the query request including the user's instant messaging identifier;
looking up data information corresponding to the user's instant messaging identifier based on a stored correspondence between the user's instant messaging identifier and the data information; and
sending a query result including the looked up data information and the user's instant messaging identifier to the instant messaging server.

20. The method as described in claim 19, further comprising:
looking up the data information corresponding to the user's instant messaging identifier comprising:
determining a URL address information relating to a data information based on the stored correspondence between the user's instant messaging identifier and the data information, wherein the data information comprises the URL address information; and
regarding data content included in the determined URL address information as the data information corresponding to the user's instant messaging identifier.

21. An instant messaging server for pushing information, comprising:
at least one processor configured to:
determine whether a user's instant messaging identifier has a corresponding target database based at least in part on whether there is a stored correspondence between a first instant messaging identifier and the target database;

in the event that the user's instant messaging identifier does not have the corresponding target database:
send an additional information request to an instant messaging client associated with the user;
receive a response message from the instant messaging client, the response message including additional data information and a first instant messaging identifier;
select the target database;
send the included additional data information and the first instant messaging identifier to the selected target database; and
locally store a correspondence between the first instant messaging identifier and the selected target database;

in the event that the user's instant messaging identifier has the corresponding target database:
send a query request including a user's instant messaging identifier to the target database; and
receive a query result including data information corresponding to the user's instant messaging identifier;

determine the instant messaging client to push information based on the user's instant messaging identifier; and push the data information to the determined instant messaging client, wherein the data information is looked up in the target database based on a stored correspondence between the user's instant messaging identifier and the data information; and a memory coupled to the at least one processor and configured to provide the at least one processor with instructions.

22. A system for pushing information, comprising:
at least one processor configured to:
determine whether a user's instant messaging identifier has a corresponding target database based at least in part on whether there is a stored correspondence between a first instant messaging identifier and the target database;
in the event that the user's instant messaging identifier does not have the corresponding target database:
send an additional information request to an instant messaging client associated with the user;
receive a response message from the instant messaging client, the response message including additional data information and a first instant messaging identifier;
select the target database;
send the included additional data information and the first instant messaging identifier to the selected target database; and
locally store a correspondence between the first instant messaging identifier and the selected target database;

in the event that the user's instant messaging identifier has the corresponding target database:
send a query request including an instant messaging identifier of a user to the target database; and
receive a query result containing data information corresponding to the user's instant messaging identifier sent by the target database;
determine the instant messaging client to push information, the determination being based on the user's instant messaging identifier; and
push the data information to the determined instant messaging client; and a memory coupled to the at least one processor and configured to provide the at least one processor with instructions.

23. A computer program product for pushing information, the computer program product being embodied in a tangible non-transitory computer readable storage medium and comprising computer instructions for:
determining whether a user's instant messaging identifier has a corresponding target database based at least in part on whether there is a stored correspondence between a first instant messaging identifier and the target database;
in the event that the user's instant messaging identifier does not have the corresponding target database:
sending an additional information request to an instant messaging client associated with the user;
receiving a response message from the instant messaging client, the response message including additional data information and a first instant messaging identifier;
selecting the target database;
sending the included additional data information and the first instant messaging identifier to the selected target database; and
locally storing a correspondence between the first instant messaging identifier and the selected target database;
in the event that the user's instant messaging identifier has the corresponding target database:
sending a query request including a user's instant messaging identifier to the target database; and
receiving a query result including data information corresponding to the user's instant messaging identifier from the target database;
determining an instant messaging client to push the data information, the determination being based on the user's instant messaging identifier; and
pushing the data information to the determined instant messaging client,
wherein the data information is looked up in the target database based on a stored correspondence between the user's instant messaging identifier and the data information.

* * * * *